Nov. 17, 1953          P. H. STANLEY          2,659,444
MOLDED AIRCRAFT SUSTAINING ROTOR BLADE
Filed June 21, 1949          2 Sheets-Sheet 1
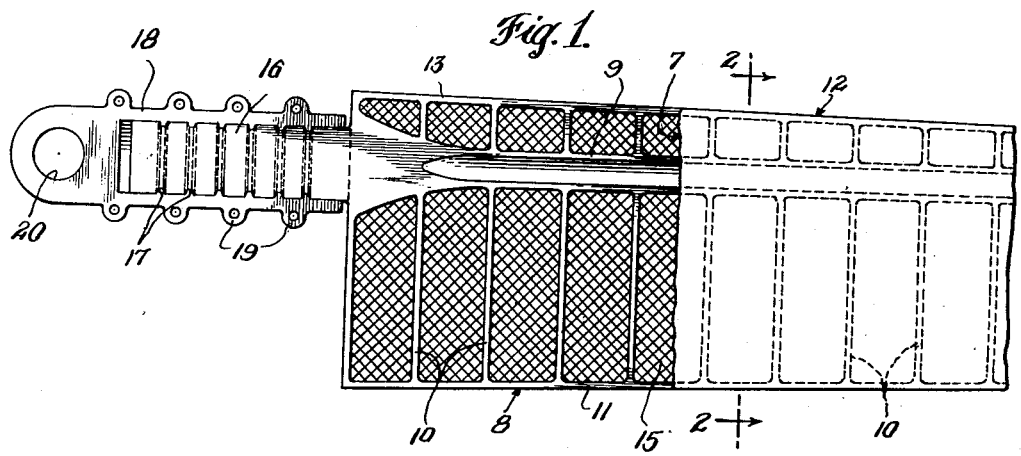
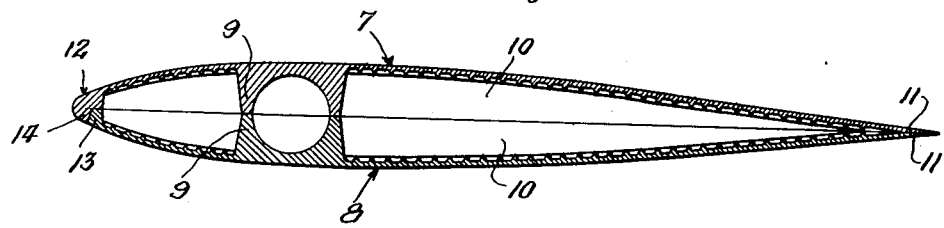
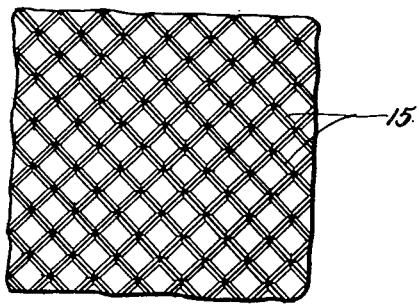
Inventor
Paul H. Stanley
Attorneys Nov. 17, 1953    P. H. STANLEY    2,659,444
MOLDED AIRCRAFT SUSTAINING ROTOR BLADE
Filed June 21, 1949
2 Sheets-Sheet 2
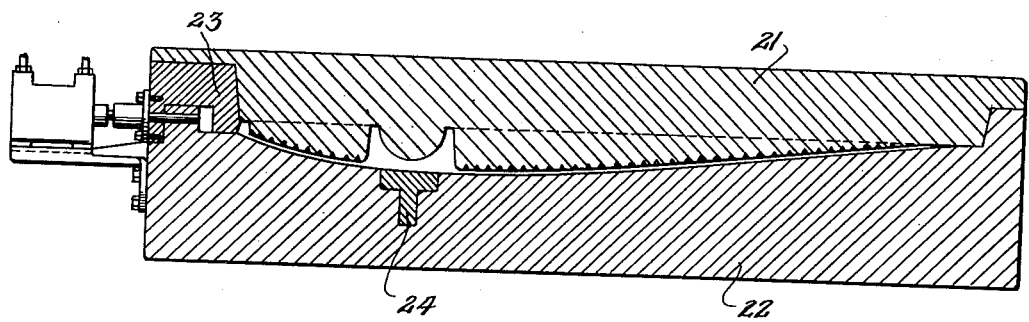
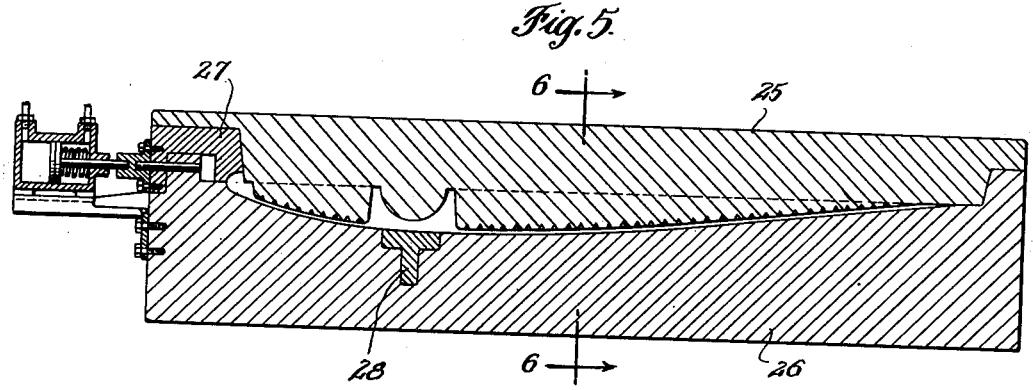
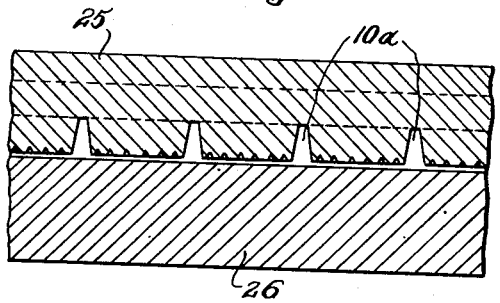
Inventor
Paul H. Stanley
By
Attorneys Patented Nov. 17, 1953

2,659,444

UNITED STATES PATENT OFFICE 2,659,444

MOLDED AIRCRAFT SUSTAINING ROTOR BLADE

Paul H. Stanley, Glenside, Pa., assignor to Autogiro Company of America, Philadelphia, Pa., a corporation of Delaware Application June 21, 1949, Serial No. 100,414

1 Claim. (Cl. 170—159)

This invention relates to the structure and manufacture of aircraft sustaining rotor blades, especially adapted for use on pivoted blade helicopters, the invention being especially concerned with a blade adapted to be molded of plastic materials.

In general the blade of the invention comprises upper and lower molded blade portions or halves having mating surfaces lying substantially in the plane of the chord of the blade, each blade portion being provided with spar and rib elements molded integrally therewith and also with a root end stub part molded integrally therewith in alignment with its spar element, so that upon assembly and securing together of the two blade halves a very strong structure is provided while at the same time retaining a desirable light weight characteristic.

Various of the objects of the invention include simplification of manufacturing technique, providing a blade of inexpensive construction, and further providing a blade having various other desirable characteristics, such as exceptional surface smoothness, considerable torsional rigidity, and a good measure of flexibility in a plane transverse the plane of the blade, i. e., in the flapping plane.

How the foregoing and other objects and advantages are attained will appear more fully from the following description, referring to the accompanying drawings, in which—

Figure 1 is a plan view of the inner or root end portion of a blade constructed according to the present invention, part of the upper half of the blade being broken away at the root, to disclose the configuration of the lower blade part;

Figure 2 is a transverse sectional view taken as indicated by the line 2—2 on Figure 1, but on an enlarged scale;

Figure 3 is a further enlarged detailed view of the inner surface of one of the blade halves;

Figure 4 is a transverse sectional view through a mold adapted to form the lower half of a blade of the type shown in Figures 1 to 3;

Figure 5 is a view similar to Figure 4 but showing the mold for making the upper half of the blade; and Figure 6 is a fragmentary sectional view taken as indicated by the section line 6—6 on Figure 5.

Referring now to the drawings and first to Figures 1, 2 and 3, the blade of the invention is preferably made up of two portions respectively comprising the upper and lower halves of the blade. These two portions are indicated generally by the numerals 7 and 8 in the drawings. It should be understood that the plan form and section of the blade may vary according to the particular design and aerodynamic characteristics contemplated. In general sustaining rotor blades as used for example on helicopters are rather long in comparison with the chord dimension and are adapted to be connected to a rotor hub at the root end thereof, usually by means of one or more pivot joints providing for swinging movements of the blade and/or pitch change movement thereof.

The two molded portions or halves of the blade may in most respects be similar to each other, although in the case of a blade section in which the upper and lower surfaces are not symmetrically cambered, the two halves will, of course, differ from each other with respect to external surface contour. Each portion or half is desirably provided with a half portion of a spar-like element 9, and also with transverse rib elements 10 all of which are integrally molded with the remainder of the blade half. These spar and rib elements 9 and 10 have surfaces adapted to mate with each other when the two blade halves are assembled, such surfaces lying in the plane of the blade chord. Trailing edge stringers 11—11 also have similar mating surfaces in the plane of the blade chord. The nose piece 12 of the upper blade half is formed with one surface lying in the plane of the blade chord and mating with the leading edge strip 13 of the lower blade half. The nose piece 12, however, also has a downward extension as indicated at 14 in Figure 2 fitting in front of the strip 13 of the lower portion. This is of advantage in providing an unbroken and very smooth contour and surface over the nose portion of the blade.

The interior surface of the blade portions is advantageously provided with a waffle pattern ribbing most clearly shown at 15 in Figure 3. This ribbing, as is indicated in Figure 1, is arranged with the ribbing elements extended diagonally of the blade, i. e., at about 45° with reference to the longitudinal axis of the blade. This ribbing is of importance in contributing localized stiffening to preserve the desired airfoil contour, and to contribute torsional rigidity to the blade structure while at the same time retaining relatively light weight.

At the inner end of each blade half a stub part 16 is provided in alignment with the spar element 9, the stub part also being molded integrally with the remainder of the blade portion and having grooves 17 molded therein which grooves are adapted to cooperate with interfitting internal rings provided on the root end mounting socket parts 18. When the two halves of the blade are assembled, the two stub parts 16 are brought together and this forms a substantially circular shank having external grooves extending around the circumference. Two half socket parts 18 are adapted to be employed, these parts being adapted to be secured to each other by bolts extended through apertured lugs such as shown at 19 to clamp the stub parts 16 together. At the root end of the socket parts 18 apertures such as indicated at 20 are provided for cooperation with a blade mounting pivot, the aperture as shown in Figure 1 being adapted to receive a "drag" pivot on which the blade would have freedom for swinging movement fore and aft in the general path of rotation thereof.

In considering the fabrication of a blade of the type shown in Figures 1 to 3, attention is directed to Figures 4, 5 and 6. In Figure 4 upper and lower mold parts 21 and 22 are shown, these mold parts being shaped to mold the lower blade half indicated at 8 in Figures 1 and 2. A displaceable mold or die part such as indicated at 23 may be provided in order to facilitate separation of the molded piece from the mold after formation of the piece. It will be understood that the mold is appropriately gated for introduction of the plastic material, and that the upper and lower halves of the mold are separable after molding of a piece. The knock-out bar shown at 24 advantageously extends throughout the length of the mold and may be utilized to free the molded piece from the mold.

In Figure 5 similar upper and lower mold parts 25 and 26 are shown for molding the upper half of the blade. Here again a displaceable die part 27 is employed at the nose portion and a knockout bar 28 is also used.

From the transverse section of Figure 6 it will be seen that the upper mold part 25 is provided with recesses indicated at 10a which form the rib elements. Other contours of the mold parts will be understood from comparison of Figures 1, 2 and 3 with Figures 4, 5 and 6.

In molding a blade of the character disclosed, it is contemplated that moldable plastic type materials be utilized. For example, such a blade might be molded of various of the urea formaldehyde resins, or one of the synthetic polyamides might be used, for instance polyhexamethylene adipamide, known to the trade as nylon. These and other plastic materials have good strength characteristics, without excessive weight. After formation of the blade halves, they are placed together and secured to each other over the extensive mating surfaces of the spar and rib elements, as well as of the trailing edge and nose edge pieces. Since substantially all of these surfaces lie in a common plane, i. e., the plane of the blade chord, they may very readily be brought together and also very readily coated with any desired adhesive material. It is contemplated that the two blade halves be secured to each other merely by an adhesive bond between the surfaces lying in the plane of the blade chord, except for the clamping action of the socket parts 18 on the blade root mounting shank 16—16.

According to the foregoing, a blade is provided which is exceptionally easy and inexpensive to manufacture and which has good strength while retaining a good strength to weight ratio.

I claim:

An aircraft sustaining rotor blade including two molded blade portions respectively comprising the upper and lower halves of the blade, said two portions having interengaging surfaces lying substantially in the plane of the blade chord and being adhesively bonded together to provide a high degree of rigidity in said plane, one of said portions having a nose piece which extends across and fits against the leading edge of the other to provide a smooth nose contour, said portions having stub parts projecting from the root end thereof with interengaging surfaces whereby to provide a blade mounting member adapted to carry the centrifugal load, said portions each having a strengthening, concave, half-spar element extended longitudinally of the blade and interconnected with each other, and each of said portions further having half rib elements molded integrally therewith and having mating surfaces in the plane of the blade chord.

PAUL H. STANLEY.

References Cited in the file of this patent

UNITED STATES PATENTS

| Number | Name | Date |
|---|---|---|
| 1,843,206 | Coffman | Feb. 2, 1932 |
| 1,937,966 | Junkers | Dec. 5, 1933 |
| 2,214,622 | Lorenzen | Sept. 10, 1940 |
| 2,231,888 | Couch | Feb. 18, 1941 |
| 2,259,247 | Dornier | Oct. 14, 1941 |
| 2,412,908 | Platt | Dec. 17, 1946 |
| 2,454,200 | Perkins | Nov. 16, 1948 |
| 2,457,202 | Brady | Dec. 28, 1948 |
| 2,458,975 | Brady | Jan. 11, 1949 |
| 2,482,217 | Sacchini | Sept. 20, 1949 |
| 2,484,141 | Alex | Oct. 11, 1949 |